United States Patent
Rossanese et al.

(10) Patent No.: US 7,479,244 B2
(45) Date of Patent: *Jan. 20, 2009

(54) PROCESS FOR THE PRODUCTION OF PLATES MADE OF TRANSPARENT PLASTIC MATERIAL WITH NON-TRANSPARENT AREAS

(75) Inventors: Afro Rossanese, Noventa di Piave (IT); Maurizio Bazzo, Oderzo (IT)

(73) Assignee: Inglass S.p.A., San Polo Di Piave (Treviso) (IT)

( * ) Notice: Subject to any disclaimer, the term of this patent is extended or adjusted under 35 U.S.C. 154(b) by 518 days.

This patent is subject to a terminal disclaimer.

(21) Appl. No.: 11/047,500

(22) Filed: Jan. 31, 2005

(65) Prior Publication Data

US 2006/0076711 A1    Apr. 13, 2006

(30) Foreign Application Priority Data

Oct. 11, 2004    (IT)    ............................ TO2004A0700

(51) Int. Cl.
B29C 45/16    (2006.01)

(52) U.S. Cl. ...................... 264/255; 264/319; 264/328.8

(58) Field of Classification Search ........................ None
See application file for complete search history.

(56) References Cited

U.S. PATENT DOCUMENTS

| | | | |
|---|---|---|---|
| 4,874,654 A | | 10/1989 | Funaki et al. |
| 5,762,855 A | | 6/1998 | Betters et al. |
| 5,788,906 A | * | 8/1998 | Morita ........................ 264/245 |
| 5,795,526 A | * | 8/1998 | Matsumoto et al. ......... 264/266 |
| 5,922,369 A | | 7/1999 | Yanagihara et al. |
| 6,245,415 B1 | * | 6/2001 | Keller et al. ................ 428/188 |

FOREIGN PATENT DOCUMENTS

| | | |
|---|---|---|
| DE | 38 20 232 A1 | 12/1988 |
| DE | 44 17 404 A1 | 11/1994 |
| DE | 20 2004 003 468 U1 | 7/2004 |
| DE | 20 2004003 468 U1 | 7/2004 |
| EP | 0 043 174 A2 | 1/1982 |

OTHER PUBLICATIONS

U.S. Appl. No. 11/047,480, filed Jan. 31, 2005, Rossanese et al.
U.S. Appl. No. 11/047,498, filed Jan. 31, 2005, Rossanese et al.
U.S. Appl. No. 11/047,483, filed Jan. 31, 2005, Rossanese et al.
U.S. Appl. No. 11/047,106, filed Jan. 31, 2005, Rossanese et al.
U.S. Appl. No. 11/047,104, filed Jan. 31, 2005, Rossanese et al.

(Continued)

Primary Examiner—Monica A Huson
(74) Attorney, Agent, or Firm—Heslin Rothenberg Farley & Mesiti P.C.; Victor A. Cardona, Esq.

(57) ABSTRACT

Described herein is a process for the production of plates made of plastic material by means of sequential injection with the mould half-open and a subsequent step of compression obtained by closing the mould.

7 Claims, 3 Drawing Sheets

OTHER PUBLICATIONS

U.S. Appl. No. 11/047,481, filed Jan. 31, 2005, Rossanese et al.

U.S. Appl. No. 11/046,937, filed Jan. 31, 2005, Rossanese et al.

Jochen Mitzler, translation of "Synergy Creates New Technology", Copyrighted—Carl Hanser Verlag, Munchen, KU Kunstostoffe, plast europe, vol. 91 (2001) 10, pp. 6-9.

Website of Georg Kaufmann AG, English version, Oct. 2001—www.konsens.de/gktool/ghtool_2001_08_022_e.htm "Mould for back injection of painted foils".

Knights, Mikell "Sequential Valve Gating" Plastics Technology, Dec. 2003, available at http://www.ptonline.com/articles/200312fa1.html.

* cited by examiner

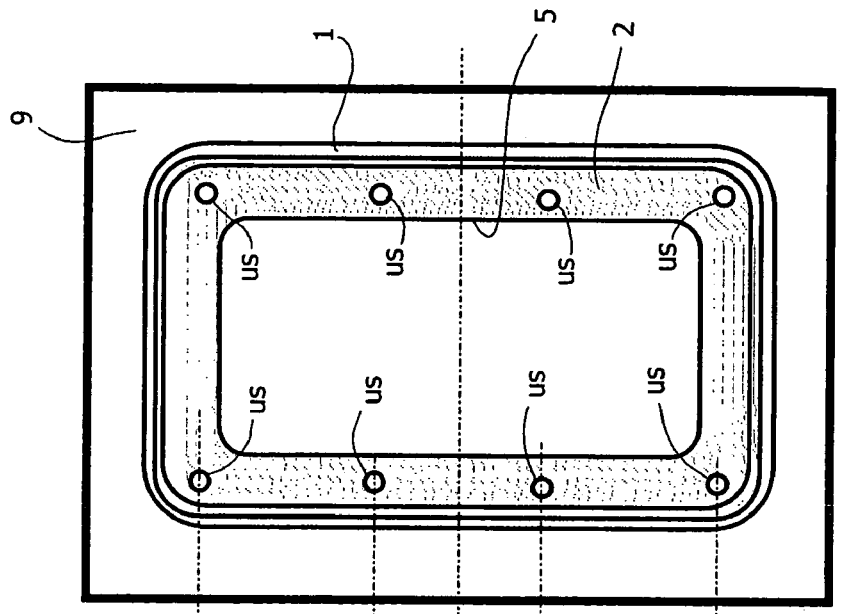
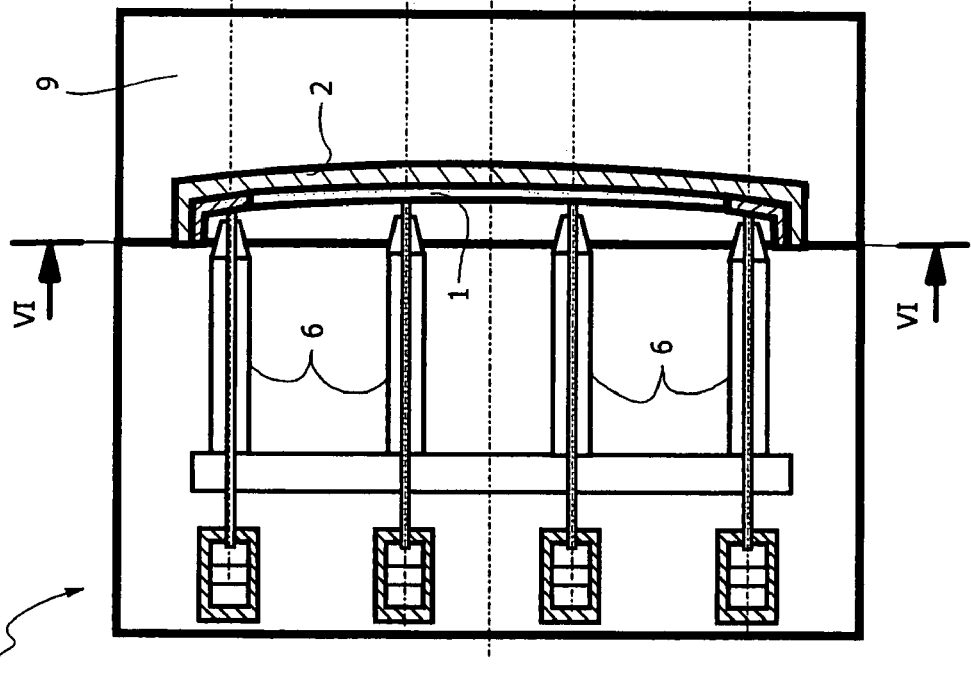

PROCESS FOR THE PRODUCTION OF PLATES MADE OF TRANSPARENT PLASTIC MATERIAL WITH NON-TRANSPARENT AREAS

CROSS-REFERENCE TO RELATED APPLICATIONS

This application claims priority from Italian application number TO2004A000700, filed on Oct. 11, 2004, the entire disclosure of which is incorporated herein by reference.

This application also relates to U.S. patent application Ser. No. 11/047,480, filed on the same day as the present patent application, and titled "AN APPARATUS AND A METHOD FOR THE INJECTION-COMPRESSION MOULDING OF ARTICLES MADE OF PLASTIC MATERIAL WITH TWO COMPONENTS," the contents of which are incorporated herein by reference.

This application also relates to U.S. patent application Ser. No. 11/047,498, filed on the same day as the present patent application, and titled "A PROCESS FOR THE PRODUCTION OF PLATES MADE OF TRANSPARENT PLASTIC MATERIAL WITH NON-TRANSPARENT OVERINJECTED PARTS," the contents of which are incorporated herein by reference.

This application also relates to U.S. patent application Ser. No. 11/047,483, filed on the same day as the present patent application, and titled "A METHOD AND AN APPARATUS FOR THE PRODUCTION OF ARTICLES MADE OF MOULDED PLASTIC MATERIAL PARTICULARLY BY MEANS OF INJECTO-COMPRESSION," the contents of which are incorporated herein by reference.

This application also relates to U.S. patent application Ser. No. 11/047,106, filed on the same day as the present patent application, and titled "AN APPARATUS AND A METHOD FOR INJECTO-COMPRESSION MOULDING OF ARTICLES MADE OF PLASTIC MATERIAL WITH TWO COMPONENTS," the contents of which are incorporated herein by reference.

This application also relates to U.S. patent application Ser. No. 11/047,104, filed on the same day as the present patent application, and titled "A PROCESS FOR THE PRODUCTION OF PLATES MADE OF PLASTIC MATERIAL WITH PARTS OVERMOULDED BY INJECTO-COMPRESSION," the contents of which are incorporated herein by reference.

This application also relates to U.S. patent application Ser. No. 11/047,481, filed on the same day as the present patent application, and titled "A METHOD FOR THE PRODUCTION OF PLATES MADE OF PLASTIC MATERIAL WITH PARTS OVERMOULDED BY INJECTO-COMPRESSION," the contents of which are incorporated herein by reference.

This application also relates to U.S. patent application Ser. No. 11/046,937, filed on the same day as the present patent application, and titled "AN APPARATUS AND A PROCESS FOR THE INJECTO-COMPRESSION MOULDING OF ARTICLES MADE OF PLASTIC MATERIAL WITH TWO COMPONENTS," the contents of which are incorporated herein by reference.

FIELD OF THE INVENTION

The present invention relates to the production of items made of bi-component plastic material, with particular—but not exclusive—reference to plates made of transparent plastic material with non-transparent areas, for example forming a continuous or discontinuous peripheral edge, such as window panels for the automotive field and screens of plasma televisions.

STATE OF THE PRIOR ART

Traditionally, such plates are produced by means of injection moulding: the transparent material, typically polycarbonate, is much more sensitive than other plastic materials to lines of flow, joints, etc., so much so that, as the dimensions of the products increase, the difficulties of injection are such that it is impossible to eliminate some typical aesthetic and optical defects unless very sophisticated injection systems are adopted. For items of modest dimensions, the so-called "film-injection" system is effectively used. This system enables many of the problems typical of these transparent plastic materials to be overcome, but as the dimensions increase does not enable sufficiently high levels of quality to be achieved. Furthermore, this type of injection involves cutting of the appendage of the film projecting from the moulded plate, said appendage having a non-negligible mass with respect to that of the product and involving an evident waste of material.

Furthermore, for these transparent plates, according to the different applications for which they are designed (and in particular in the case of use in the automotive sector), the reduction of residual internal stresses ("in-mould stresses") is of fundamental importance. These stresses tend in fact to deform the product, altering its optical and mechanical properties.

SUMMARY OF THE INVENTION

The purpose of the invention is to overcome the limitations imposed by film-injection systems and enable an efficient production of plates made of transparent material with non-transparent areas that are free from internal stresses or in any case with a very low level of stress and hence with optimal optical and mechanical properties.

A further purpose of the invention is to improve the aesthetic characteristics of plates made of transparent plastic material of large dimensions with non-transparent parts, also with reference to the visibility of the indicators or witness marks of the injection spots, typically in the form of small craters.

It should be noted that in the description and in the ensuing claims, for the non-transparent parts reference will be made to a "peripheral edge", meaning by said term also a different non-transparent part, either continuous or discontinuous.

With a view to achieving the aforesaid purposes, the subject of the present invention is a process for the production of plates made of transparent plastic material with non-transparent peripheral edges, basically characterized in that it comprises the following steps:

providing a mould, a first moulding station with a set of first injectors, a second moulding station with a set of second injectors, said first and second injectors being located in a position directly corresponding to at least one peripheral area of the plate to be produced;

injecting the transparent plastic material within said mould in the first moulding station via first said set of injectors according to a sequential modality with the mould half-open so as to distribute uniformly the pressure, preventing lines of joining of the transparent material;

closing the mould, performing compression of the transparent material and forming of the plate;

injecting the non-transparent plastic material within said mould in the second moulding station via said set of second injectors so as to overmould said peripheral edge on said peripheral area of the transparent plate.

The combination between sequential injection, compression of the transparent material, and overmoulding of the peripheral edge enables elimination of visibility of the indicators of injection of the transparent plate through the transparent material of the plate. This result is rendered possible thanks to the reduction of the internal stresses and to the optimal distribution of the pressures, which may be obtained via the process according to the invention, precisely combined with the subsequent overmoulding of the non-transparent material.

The process according to the invention envisages a particular sequential modality for the injection of the transparent plastic material and possibly also of the non-transparent plastic material by the corresponding injectors, as well as a possible step of compression at the end of the step of injection of the non-transparent plastic material.

BRIEF DESCRIPTION OF THE DRAWINGS

The invention will now be described in detail with reference to the annexed plate of drawings, in which:

FIG. 5 is a view similar to that of FIG. 3, which shows a second step of the process according to the invention; and FIG. 6 is a cross-sectional view according to the line VI-VI of FIG. 5.

DETAILED DESCRIPTION OF THE INVENTION

Figure 1:
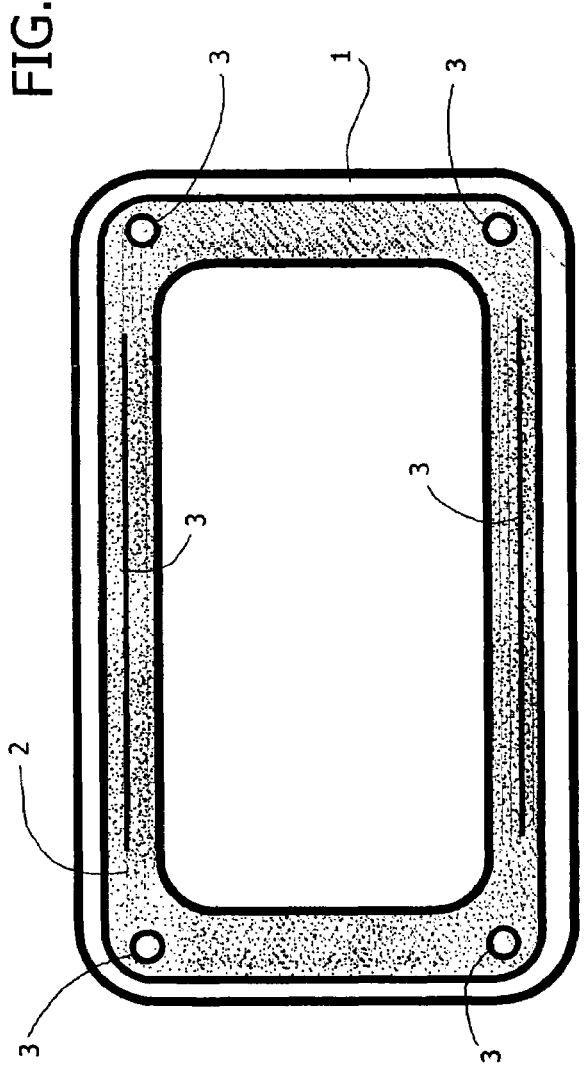
FIG. 1 is a schematic dorsal elevation of a plate made of bi-component plastic material obtained using the process according to the invention.
Figure 2:
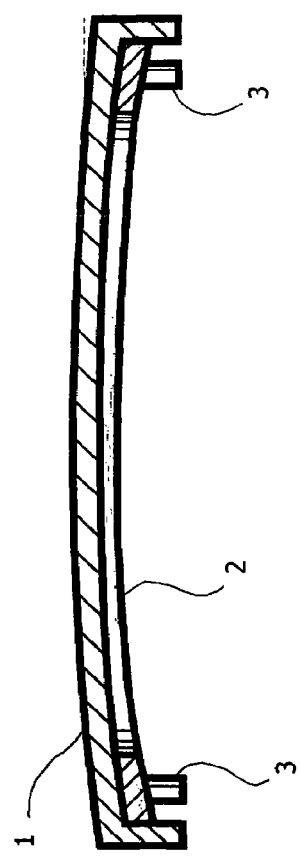
FIG. 2 is a partially sectioned side elevation of FIG. 1.
Figure 3:
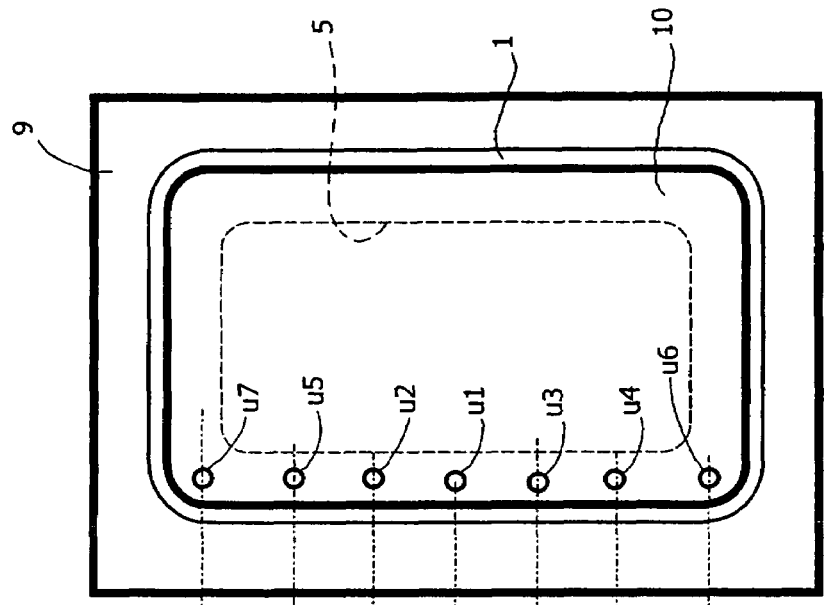
FIG. 3 is a partially sectioned schematic side elevation, which shows a first step of the process according to the invention.

FIGS. 1 and 2 of the annexed plate of drawings are schematic representations of an example of a product made of bi-component plastic material obtained with the process according to the invention.

The product is constituted by a plate 1 made of transparent plastic material, typically polycarbonate, on the dorsal face of which is applied a perimetral frame 2 made of non-transparent plastic material, formed with appendages and projections 3 usable for the assembly of the plate in the condition of use.

The process for the production of such a bi-component product envisages two successive steps, described in what follows with reference to FIGS. 3, 4 and 5, 6, respectively.

It should be noted that the process according to the invention can be implemented on a press of the stack-mould type with rotating central surface.

In this case, two moulding stations will be provided, the first designated by 7 and the second by 8, in a position corresponding to which a mould 9 is subsequently located.

The first forming station 7 is equipped with a set of first injectors 4 of a generally conventional type, with direct plugging via a respective plug 11, which can be axially displaced between a position of closing and a position of opening for introduction within the mould 9 of the transparent plastic material coming, also in a way in itself known, from a hot chamber supplied by a plasticizing system.

It should be noted that the injectors 4 are equipped with respective ring nuts, set in substantially sealed contact with the mould 9, the conformation of which (not illustrated or described herein for reasons of brevity) may be of the innovative type, for an optimal control of temperature, that forms the subject of a parallel Italian patent application filed on the same date by the present applicant.

The injectors 4 of the first moulding station 7 are aligned with respect to one another and located, with respect to the mould 9, in a position directly corresponding to a peripheral area of the transparent plate 1 to be moulded. Said peripheral area is designated by 10 in FIG. 4, and consists of a band adjacent to one of the larger sides of the plate 1 and contained within the internal boundary, designated by 5 in the same FIG. 4, of the perimetral frame 2 that will be subsequently formed in the second moulding station 8.

Figure 4:
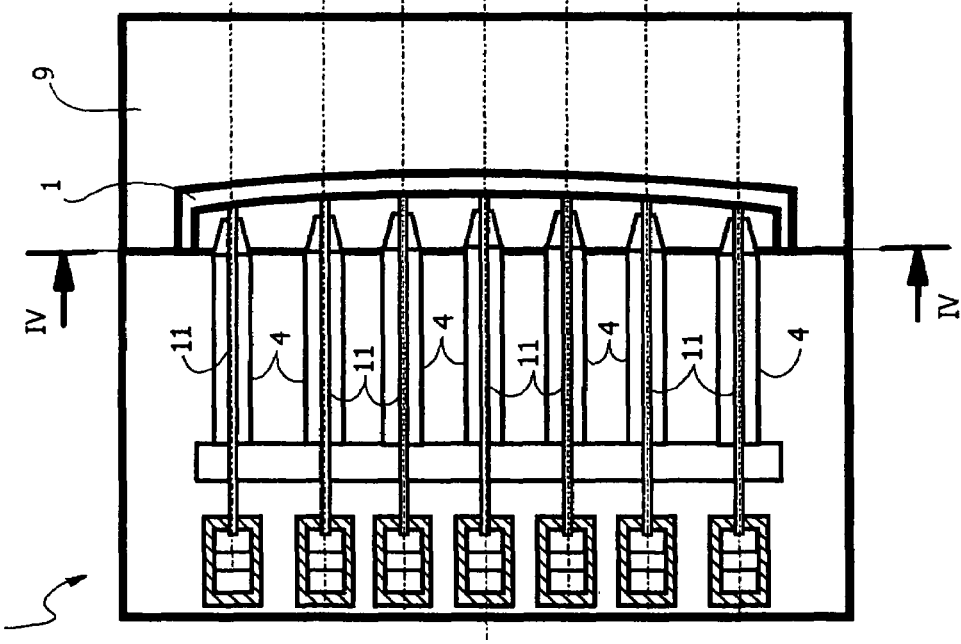
FIG. 4 is a cross-sectional view according to the line IV-IV of FIG. 3.

In the case of the example illustrated, the injectors 4 of the first moulding station 7 are seven in number: they are designated in FIG. 4, respectively, by u1 the central one, by u2 and u3 the ones adjacent on opposite sides to the central injector u1, by u4 and u5 the ones adjacent on opposite sides to the injectors u3 and u2, and by u6 and u7 the end ones, which are adjacent, respectively, to the injectors u4 and u5. Of course, the number of injectors may be greater or smaller, according to the dimensions of the plate, but the modalities for their actuation will in any case be similar to the ones described below.

Following upon the half-closing of the mould 9, which can be performed with the surfaces parallel or with surfaces inclined, the injectors 4 are activated so as to introduce the transparent plastic material within the mould 9 according to a sequential modality. In the case of the example illustrated, injection is carried out first with the injector u1 until the plastic material has covered completely the areas of injection that pertain to the injectors u2 and u3. At this point, injection through the injectors u2 and u3 is performed until the material has covered completely the areas corresponding to the injectors u4 and u5. Then, the injectors u4 and u5 are opened, and subsequently, according to the same principle, the injectors u6 and u7.

As a further improvement, the conditions of injection can be adapted to delay opening of the injector u3 slightly with respect to the injector u2, to delay opening of the injector u5 slightly with respect to the injector u4, and to delay opening of the injector u7 slightly with respect to the injector u6. In this way, benefits are achieved from the standpoint of constancy of pressure and uniformity of speed of the front of the material introduced into the mould 9.

To render the pressures within the cavity of the mould 9 uniform there may moreover be adjusted closing of the injector u1, and possibly of other injectors, prior to the end of injection. Furthermore, opening and closing of the injectors may be appropriately regulated, for example, either in time or as a function of the feed of the plastic material through the plasticization assembly of the apparatus. Even though in the case of the example illustrated the injectors 4 are arranged in alignment only along the peripheral area 10 of the plate 1, i.e., as has been said, along one of its larger sides, there are no particular limitations to providing further injectors also along the smaller sides and also along the other larger side of the plate 1. However, experimental tests conducted by the present applicant have demonstrated that the arrangement illustrated in the example is normally sufficient for optimal filling of the cavity of the mould 9 also for plates of large dimensions.

In the case where the plate 1 is of large dimensions, of fundamental importance is the reduction of the residual internal stresses (in-mould stresses) that may be generated at the end of a conventional injection, performed with the mould closed, of the transparent plastic material, which can induce deformations and alter optical properties of the plate itself.

For this reason, the sequential injection performed with the mould half-open, as described previously in the first moulding station 7, will be followed by a step of compression of the plate 1. This step of post-compression can be performed with conventional modalities: in the case where the apparatus uses a press of the stack-mould type, this step may be performed according to what is described in the German patent application No. DE-A-10217584, whilst in the case where said step of post-compression is—as will be seen in what follows— also executed in a position corresponding to the second moulding station 8, it will be necessary, in the case of a stack-mould press, to envisage specific solutions such as the ones described and illustrated in parallel Italian patent applications filed on the same date by the present applicant.

It should be noted that the step of compression of the transparent plate can be actuated, instead of simultaneously with, subsequently to the injection step.

At the end of forming of the transparent plate 1, on its peripheral area 10 there are identifiable the indicators or witness marks (in the form of small craters) of the injection spots corresponding to the nozzles of the injectors u1-u7.

The mould 9 is then transferred into a position corresponding to the second moulding station 8, represented in FIGS. 5 and 6. Also in this case, there is provided at least one set of injectors 6 aligned along the peripheral area 10 of the plate 1, and possibly a second set of injectors 6 aligned in a position corresponding to the opposite area (i.e., of the other larger side of the plate 1), as illustrated in FIG. 6. The nozzles of the injectors 6 are identified in said figure by "us".

The injectors 6 of the one or more sets may be fewer in number than the injectors 4 of the first moulding station 7, for example four in number, and it is not necessary for them to be plugging ones. These injector nozzles 6 may be controlled in sequence or else with simultaneous opening.

The non-transparent plastic material injected by the nozzles 6 will come to form the peripheral frame 2, overmoulding it on the dorsal face of the transparent plate 1 between the perimetral line 5 and the peripheral edge thereof, covering the indicators of the injection spots corresponding to the nozzles u1-u7 of the first moulding station 7.

Also in this case, the injection of the peripheral edge 2 may be followed by a step of post-compression, for example, actuated, in the case where the moulding apparatus uses a stack-mould press, with the modalities described in parallel Italian patent applications filed on the same date by the present applicant.

The process according to the invention enables all the limitations imposed by conventional moulding systems to be overcome, and enables an efficient production of bi-component plates, also with transparent surfaces of large dimensions, free from internal stresses or in any case with extremely low levels of stress and such as to prevent deformations and alterations of their optical properties. These effects are a direct consequence of the peculiar characteristics of the process according to the invention, in the first step with direct injection, with the mould half-open and with multiple spots controlled in sequence, and subsequent compression obtained by closing the mould, and with indicators of the injection of the first step covered by the material of the second injection.

Of course, the details of construction of the apparatus described merely by way of example for the embodiment of the process may vary widely with respect to what is described and illustrated herein, without thereby departing from the scope of the present invention, as defined in the ensuing claims. Thus, for example, the step of compression of the plate may also be simultaneous with the injection step carried out with the mould open.

Furthermore, even though in the foregoing description and in the ensuing claims reference is constantly made to a transparent plate and to a non-transparent peripheral edge overmoulded thereon, the invention applies in an equivalent way to articles made of any plastic material whatsoever, whether transparent or non-transparent, including even ones of small dimensions.

The invention claimed is:

1. A process for the production of plates made of transparent plastic material with non-transparent peripheral edges comprising:

providing a mould, a first moulding station with at least one set of first injectors and a second moulding station with at least one set of second injectors, said first and second injectors being located in a position directly corresponding to at least one peripheral area of the plate to be produced;

injecting the transparent plastic material within said mould in the first moulding station via said first set of injectors with the mould half-open according to a sequential modality so as to distribute uniformly the pressure, preventing lines of joining of the transparent material, wherein witness marks corresponding to said first set of injectors are provided on the injected transparent material at said at least one peripheral area;

closing the mould, performing compression of the transparent material and forming of the plate;

injecting the non-transparent plastic material within said mould in the second moulding station via said at least set of second injectors so as to overmould said peripheral edge on said peripheral area of the transparent plate wherein said witness marks are covered by said non-transparent plastic material;

said first injectors arranged in a linear manner; and wherein said sequential modality comprises first the injection by a central injector of the first set situated in a position corresponding to the median part of said peripheral area of the plate until the areas of said peripheral area corresponding to a first pair of intermediate injectors are covered; then the injection by said first intermediate injectors until the areas of said peripheral area corresponding to a second pair of intermediate injectors are covered; then the injection by said second intermediate injectors until the areas of said peripheral area corresponding to a pair of end injectors are covered; and finally injection by said end injectors.

2. The process according to claim 1, further comprising a delay of injection between the injectors of the first pair of intermediate injectors, those of the second pair of intermediate injectors, and those of the pair of end injectors.

3. The process according to claim 2, further comprising interrupting the injection by at least one of the central injector and the intermediate injectors prior to injection by the end injectors.

4. The process according to claim 1, wherein the step of injection of the non-transparent plastic material via said second set of injectors is performed according to a sequential modality.

5. The process according to claim 1, wherein the step of injection of the non-transparent plastic material via said second set of injectors is performed with a simultaneous modality.

6. The process according to claim 1, further comprising performing a step of compression of the peripheral edge overmoulded on said plate at the end of the step of injection of the non-transparent plastic material in a position corresponding to said second moulding station.

7. The process according to claim 1, wherein the step of compression of the transparent plate is performed subsequently to or else simultaneously with the injection step.

* * * * *